United States Patent [19]

Molnar

[11] 3,884,977

[45] May 20, 1975

[54] ANTIBACTERIAL QUATERNARY AMMONIUM SALTS AND METHOD OF PREPARING THE SAME

[76] Inventor: Nicholas M. Molnar, 215 E. 68th St., New York, N.Y. 10021

[22] Filed: Feb. 3, 1972

[21] Appl. No.: 223,308

[52] U.S. Cl. ...... 260/567.6 P; 252/106; 260/584 B; 424/329; 260/501.19
[51] Int. Cl. ............................................. C07c 91/02
[58] Field of Search...... 260/567.6 P, 584 B, 501.19

[56] References Cited
UNITED STATES PATENTS
2,683,147   7/1954   Airod ........................... 260/567.6 P Primary Examiner—Donald G. Daus
Assistant Examiner—W. B. Springer
Attorney, Agent, or Firm—W. Lee Helms

[57] ABSTRACT

A novel class of quaternary ammonium salts is described and characterized chemically. Preparation of a prototype of the class is described, and hereinbelow the structure of the product is specified. The letters, such as $n_1$, $n_2$, $n_3$, Z, $m$, etc., are more fully described in the specification. The antibacterial activity of this class of compounds is demonstrated and their compatibility with phenolic bacteriostats as well as with soap is illustrated.

Quaternary ammonium compounds having antibacterial action are known in the art, but have limited activity, particularly with respect to *Escherichia Coli* and *Pseudomonas aeruginosa*, also tending toward skin and eye irritation, and also have limited compatibility, if any, with phenolic antimicrobial agents. These and other limitations in said known salts are overcome by the novel compounds contemplated by the present invention.

6 Claims, No Drawings

ANTIBACTERIAL QUATERNARY AMMONIUM SALTS AND METHOD OF PREPARING THE SAME

In accordance with this invention, the particular group of quaternary ammonium compounds is characterized by the presence of from three to six free hydroxyl groups, from one to four chlorine or bromine atoms, of two quaternary nitrogens in their cations and by the presence of two ionizable anions. Further characteristics are evident from the general formula:

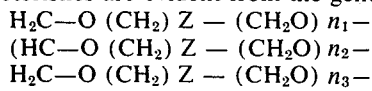

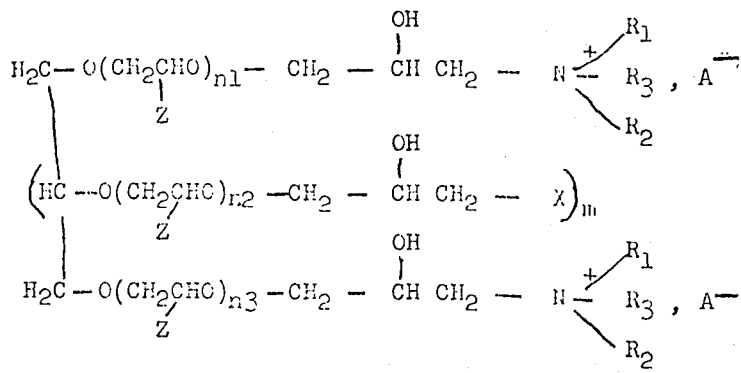

wherein $R_1$ and $R_2$ are alkyl groups each containing 1 to 3 carbon atoms, $R_3$ is alkyl or alkenyl containing 8 to 18 carbon atoms, Z is hydrogen or $CH_3$, X is chlorine or bromine, A is chosen from the group of chloride, bromide, iodide, paratoluene sulfonate or any other physiologically acceptable anion, $n_1$, $n_2$ and $n_3$ are integers ranging from 1 to 10, and $m$ has the value of 1 or 2.

As shown, the backbone of the novel quaternary salts is formed by polyols chosen from the group of 3 to 6 polyhydric aliphatic alcohols. Illustrative of this group are glycerol, pentaerytherol and sorbitol. The polyols are condensed with an appropriate 1,2-epoxyalkane, such as ethylene or propylene oxide. The resulting polyethers are next reacted with epichloro or epibromohydrin. Finally, the obtained organic halides are condensed with a tertiary amine containing one higher alkyl or alkenyl or halo-substituted alkyl radical. Illustrative examples are decyl dimethylamine, dodecyl dimethylamine and di-n-propyl octylamine. In connection with the latter reaction, the unexpected observation was made that only the two halides whose positions corresponds to the positions of the primary alcoholic groups in the starting polyols react with the tertiary amines employed. The following example illustrates the sequence of reactions and the chemical operations involved.

EXAMPLE

I. The intermediate product I is prepared from commercially available ethoxylated glycerol as follows:

To 648 g (1 mol) of ethoxylated glycerin (containing approximately 12 + ethylene groups) and 3 milliliters of the $BF_3$-ether complex add 278 g of epichlorohydrin at 90°C then cool to 25°C; add 21 grams of active $Al_2O_3$ followed by 600 ml of acetone; filter off $Al_2O_3$ and strip acetone.

The intermediate product I is a viscous liquid. Yield: 877 g. Equivalent weight of intermediate I is 309 (⅓ of mol. wt.).

The reaction may be illustrated by the following equation:

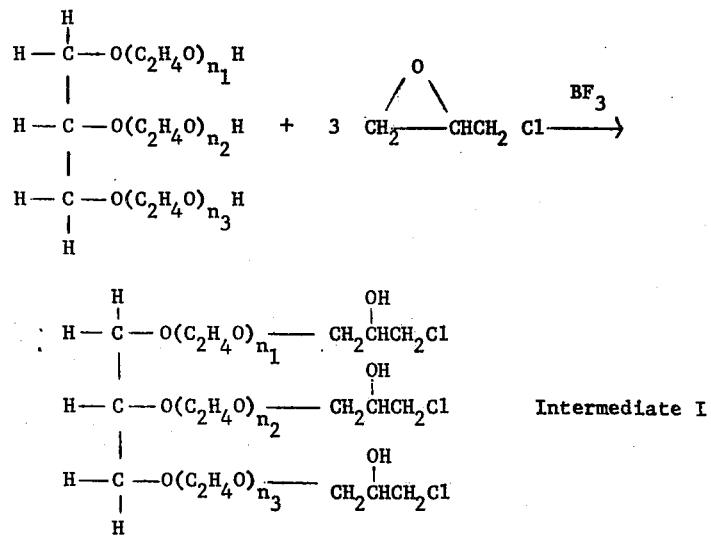

$n_1 + n_2 + n_3$ = approximately 12+

II. Mix 309 g (⅓ mol) of I, 180.5 g (⅔ mol) dimethyl dodecyl-amine and 600 ml n-butanol.

*Dodecyl in this instance, but not limited thereto, a commercial product containing, for instance, 65% $C_{12}$, 25% $C_{14}$ and 10% $C_{10}$ alkyls may be used as well.

Maintain the reaction mixture at 115°–120°C for 18 hours. Then strip off butanol; a viscous fluid is obtained in nearly quantitative yield.

The product thus obtained, and referred to in the following as HQ8, shows on analysis three free hydroxy groups, and three chlorines, one of the latter is not ionized in solution.

The formula of the compound is as follows:

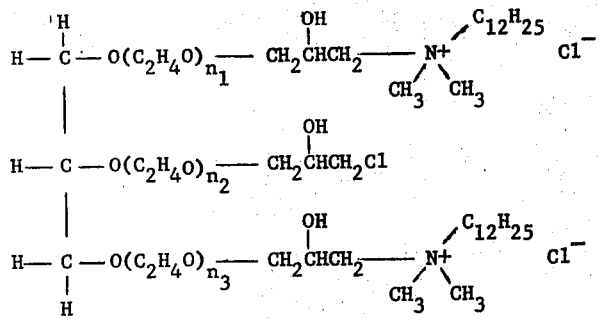

Where $n_1 + n_2 + n_3 = 12$

Obviously any other suitable tertiary amine may be used as a quaternizing agent such as those containing higher alkenyl or halogen-substituted alkyl or alkenyl groups. In place of the methyl groups, may be ethyl or propyl or both ethyl and propyl and be within the scope of this patent disclosure. In addition, the anion may be bromide, iodide, para-toluenesulfonate or any other physiologically acceptable anion.

The quaternary ammonium compounds subjects of the invention, are soluble in water, have very low toxicity, and are safe to the skin under use dilution, and are compatible with phenolic type antibacterial agents, the latter having very low activity, if any, against in-hospital occurring disease-producing *pseudomonas* strains. The present compounds are effective against the latter Gram-negative organism, and against *E. coli* as well; also against Gram-positive organisms such as *Staphylococcus aureus*, and against fungi, such as *Aspergillus niger*. *Pseudomonas aeruginosa* is an unusually resistant organism, but HQ 8 as shown below was found very effective.

| Organism | Minimum Effective Concentration Bactericidal | Bacteriostatic |
|---|---|---|
| *Staphylococcus aureus* | 5 ppm | 5 ppm |
| *Escherichia coli* | 22 ppm | 19 ppm |
| *Pseudomonas aeruginosa* | 43 ppm | 22 ppm |
| *Aspergillus niger* | 37 ppm | 37 ppm |

A most unexpected and useful finding was that the quaternary is compatible with phenolic disinfectants, such as tribromosalicylanilide and 4,2',4'-trichloro-2-hydroxydiphenylether. These two materials are not useful individually. Our tests indicate that although the HQ 8 alone is effective against *Pseudomonas aeruginosa*, it is not so when it is used in the presence of a detergent system of a surgical scrub. Neither is the composition of 3,4',5 tribromosalicylanilide alone or the 4,2',4 trichloro-2-hydroxydiphenyl ether alone or in combination with each other effective against *Pseudomonas aeruginosa* in the detergent system which is physiologically suitable for a surgical scrub. However, by solubilizing the above phenolic germicides with HQ 8, activity is noted against *Pseudomonas aeruginosa*. Eye or skin irritation is not caused by suitably compounded compositions. Also discovered was the unexpected finding that HQ 8 has the capacity to solubilize in water the above normally-water-insoluble germicides, thus increasing and broadening their antibacterial properties, rendering said composition unexpectedly effective against *Pseudononas aeruginosa*.

BIOLOGICAL TEST I

The sample was a 37 percent (weight/weight) solution of HQ 8 in water. (Originally, dilutions were recorded as dilutions of the above solution, but are here transposed and tabulated as dilutions of the active ingredient).

| Test media Innoculum: | Nutrient broth (Difco) Bacteria — 1% of 24 hr. broth culture. Fungi — 1% of a 10% dilution of a 7 day spore growth. |
|---|---|
| Subculture media: | Letheen Broth (Difco). |
| Incubation: | 48 hours at 37°C. |

| Results Dilutions of HQ-8 (ppm) | ORGANISMS | | | | | | | |
|---|---|---|---|---|---|---|---|---|
| | S. aureus | | E. coli | | Ps. aeruginosa | | A. niger | |
| | MEC | kill | MEC | kill | MEC | kill | MEC | kill |
| 11,100 | − | − | − | − | − | − | − | − |
| 5,550 | − | − | − | − | − | − | − | − |
| 2,775 | − | − | − | − | − | − | − | − |
| 1,988 | − | − | − | − | − | − | − | − |
| 694 | − | − | − | − | − | − | − | − |
| 347 | − | − | − | − | − | − | − | − |
| 174 | − | − | − | − | − | − | − | − |
| 87 | − | − | − | − | − | − | − | − |
| 43 | − | − | − | − | − | − | − | − |
| 37 | − | − | − | − | − | + | − | − |
| 22 | − | − | − | − | − | + | + | + |
| 19 | − | − | − | + | + | + | + | + |
| 9 | − | − | + | + | + | + | + | + |
| 5 | − | − | + | + | + | + | + | + |
| 2 | + | + | + | + | + | + | + | + |
| 1 | + | + | + | + | + | + | + | + |
| Organism Controls | + | + | + | + | + | + | + | + |

Legend:
(+) means growth (signifies no antimicrobial activity)
(−) means no growth (signifies antimicrobial activity)

BIOLOGICAL TEST II

This test demonstrates that the compounds of the present invention are compatible with phenolic type antimicrobial agents, and further, that they exhibit substantivity in the standard tests as referred to by Skin Disk Substantivity Test (exposure of skin and subsequent rinsing with tap water of approximately 260 ppm hardness). For comparative control, a commercial product, sold under the tradename pHisoHex, containing 3 percent hexachlorophene was used.

The formulation employed: LAB NO. FO 71-596
- 4% HQ 8
- 2% 3,4',5 tribromosalicylanilide (Temasept, Fine Organics T.M.)
- 0.5% 4,2',4' trichloro-2-hydroxydiphenylether
- 20-37% surface active agents, principally anionic in character, 10% (of 37%) being partly anionic and partly nonionic.
- 9% (approximately) other adjuvants
- 47.5% Water Conditions of Test II

| | |
|---|---|
| Test dilutions: | as is (10 gm sample) |
| | 8% solution (w/v — 25 cc sample) |
| Contact Time: | 15 minutes at room temperature (RT) |
| | 30 minutes at room temperature |
| | 18 hours at 4°C |
| Test Organisms: | S. aureus |
| | E. coli |
| | Ps. aeruginosa |
| Incubation: | 24 hours at 37°C |
| Steeping Time: | 15 minutes at 45°C |
| Rinse Time: | 5 minutes in running tap water |
| Test Media: | AATCC Bacteriostasis Agar (Difco) |
| Inoculum: | 1% |

The results are tabulated and recorded according to the standard test procedure as employed in "In Vitro Tests for Measuring Antibacterial Activity of Toilet Soap and Detergent Bars," *Journal of Pharmaceutical Sciences*, Vol. 50 Pg. 827, Vinson et al., author.

The "contact" time defines the length of time the treated skin disk is in contact with the bacteriologically inoculated agar media at room temperature (R.T.) and at 4°C. It is to be noted that when antimicrobial substances are strongly substantive to the skin (this being desirable) it takes longer time (30 minutes vs. 15 minutes) to demonstrate their presence, because of slow diffusion from the skin disk into the culture medium, the colder temperature of 4°C (refrigerator temperature) is necessary for long contact time — 18 hours — to prevent the organisms growing in the test media before diffusion takes place.

Test II Results:

(Duplicate results recorded)

(A) Contact time — 15 minutes at RT

| Sample | S. aureus | E. coli | Ps. aeruginosa |
|---|---|---|---|
| 71-596 as is | 4,4 | 1,1 | 1,1 |
| 8% | 2,2 | 0,0 | 0,0 |
| *pHisoHex as is | 4,4 | 0,0 | 0,0 |
| 8% | 4,4 | 0,0 | 0,0 |

(B) Contact time — 30 minutes at RT

| | | | |
|---|---|---|---|
| 71-596 as is | 4,4 | 2,2 | 1,1 |
| 8% | 4,4 | 1,1 | 0,0 |
| pHisoHex as is | 4,4 | 0,0 | 0,0 |
| 8% | 4,4 | 0,0 | 0,0 |

(C) Contact time — 18 hours at 4°C

| | | | |
|---|---|---|---|
| 71-596 as is | 4,4 | 4,4 | 2,2 |
| 8% | 4,4 | 3,3 | 1,1 |
| pHisoHex as is | 4,4 | 0,0 | 1,1 |
| 8% | 4,4 | 0,0 | 0,0 |

*A commercial surgical scrub preparation containing 3% hexachlorophene.

Ratings:
4 - clear, sharply outlined zones - excellent activity
3 - hazy periphery - good activity
2 - partial growth - fair activity
1 - growth almost equal to surrounding area - poor activity
0 - no zone of inhibition - no activity The foregoing test formulation showed superiority, particularly at 30 minutes and 18 hours contact time, against the important Gram-negative organisms of *Escherichia coli* and *Pseudomonas aeruginosa* when compared with pHisoHex (a commercial product containing 3 percent hexachlorophene, a commonly used hospital surgical scrub, chemically 2,2' methylene bis (3,4,6 trichlorophenol) the latter showing no activity against *E. coli* and negligible or no activity against *Ps. aeruginosa*.

BIOLOGICAL TEST III

This test shows that by tube dilution technique the formula used in Biological Test III killed *S. aureus*, *E. coli* at a dilution of at least 1:30 and *Ps. aeruginosa* at 1:15 dilution and inhibited the growth of all these organisms at least 1:30, whereas pHisoHex gave kill at these dilutions only against *S. aureus*, and failed to kill *E. coli* and *Ps. aeruginosa* at 1:5 dilution.

Conditions of Test III: (Tube Dilution Method)
Samples tested same as in Test II.
Organisms: *S. aureus*, *E. coli*, *Ps. aeruginosa*
Dilution media: AATCC Bacteriostasis Broth
All dilutions were w/v.

Results of Test III:

| | No. 71-596 | | | | | | pHisoHex | | | | |
|---|---|---|---|---|---|---|---|---|---|---|---|
| Dilution | S. aureus | | E. coli | | Ps. aeru. | | S. aureus | | E. coli | | Ps. aeru. |
| | MEC | kill | MEC | kill | MEC | kill | MEC | kill | MEC | kill | MEC | kill |
| 1-5 | − | − | − | − | − | − | − | − | − | + | − | − |
| 1-10 | − | − | − | − | − | − | − | − | + | + | + | − |
| 1-15 | − | − | − | − | − | − | − | − | + | + | + | − |
| 1-30 | − | − | − | − | − | + | − | − | + | + | + | − |
| Control | + | + | + | + | + | + | + | + | + | + | + | − |

BIOLOGICAL TEST IV

Shows the activity of the present compound, as of the Test I formula, in the presence of soap. The slightly better Gram-positive action in presence of soap was offset somewhat in the lower activity against the Gram-negative. Comparison of Tables I and IV is suggested.

SAMPLE: HQ 8

Test Media: Nutrient Broth containing 8 percent ivory Soap

| | S. aureus | | E. coli | | Ps. aeruginosa | | Salmonella choleraesuis | |
|---|---|---|---|---|---|---|---|---|
| Dilutions | MEC | kill | MEC | kill | MEC | kill | MEC | kill |
| ppm | | | | | | | | |
| 1000 | − | − | − | − | − | + | − | − |
| 500 | − | − | − | + | − | + | − | − |
| 250 | − | − | − | + | − | + | − | + |
| 125 | − | − | − | + | + | + | − | + |
| 62.5 | − | − | − | + | + | + | − | + |
| 31 | − | − | + | + | + | + | + | + |
| 15.5 | − | − | + | + | + | + | + | + |
| 7.8 | − | − | + | + | + | + | + | + |
| 3.9 | − | − | + | + | + | + | + | + |
| 1.9 | − | − | + | + | + | + | + | + |
| Controls | + | + | + | + | + | + | + | + |

SAFETY

A comparative test was done on pHisoHex and the surgical scrub formulation as above disclosed to determine possible brain cell damage to rats through dermal application; surgical scrub containing 4 percent of HQ 8 and 2% 3,4',5 tribromosalicylanilide (Temasept IV) and 0.5% 4,2'4' trichloro-2-hydroxydiphenylether and the pHisoHex scrub containing 3 percent hexachlorophene. Daily application was conducted for 30 days, after which the rats were sacrificed and the brains fixed in Bouins' Solution for microscopic study.* Staining and mounting of the tissues were done* by Histological Enterprises, Fort Washington, Penna. Histopathological evaluation of the brain tissues was made by Donald A. Willigan, D.V.M., Ph.D.**

*Method described in "The oral and Dermal Toxicity of Hexachlorophene in Rats", Gaines & Kimbrough, Tenth Annual Meeting of the Society of Toxicology, Washington, D.C., March 7-11, 1971. Abstract No. 37.

**Microscopic Evaluation of Rat Brains From Five Experimental Groups, August 24, 1971, Donald A. Willigan, D.V.M., Ph.D.

It was found that Temasept 14 (3,4',5 tribromosalicylanalide) caused no demyelination (spongy degeneration) of the white matter and fiber tracks (cerebrum, cerebellum, and modella oblongata) of the brain. pHsioHex containing 3 percent hexachlorophene (2,2'-methylenebis-3,4,6-trichlorophenyl) used as a comparative control, under the same conditions, produced gross microscopic changes in the white matter of the brain.* Microscopic examination of tissue sections of the brain also showed the formulation FO 71-596 containing 4% HQ8, 2% TBS and 0.5% 4,2',4' trichloro-2- hydrocydiphenylether, when applied dermally for 30 days to rats, failed to show any brain damage on any of the test animals, whereas the application of pHisoHex containing 3% hexachlorophene exhibited brain damage on all of the test animals of the control tests.

*Method described in "The oral and dermal toxicity of hexachlorophene in Rats", Gaines & Kimbrough, Tenth Annual Meeting of the Society of Toxicology, Washington, D.C. Mar. 7-11, 1971 Abstract No. 37.

Eye irritation studies and skin irritation studies showed the disclosed formulation to be safe.

Having described my invention, what is claimed is as follows:

1. A quaternary ammonium salt of the following general structure:

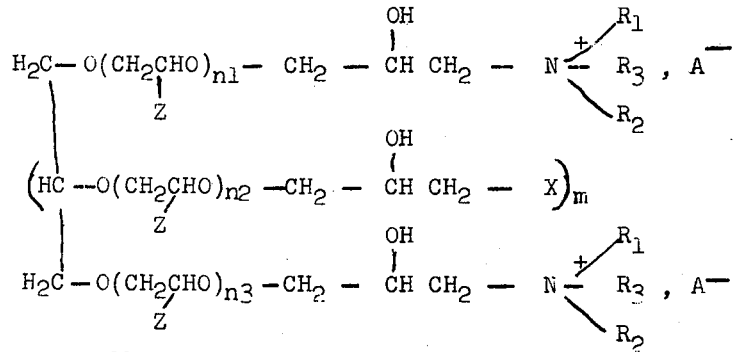

wherein $R_1$ and $R_2$ are alkyl groups each having 1 to 3 carbon atoms, $R_3$ is alkyl or alkenyl containing 8 to 18 carbon atoms, Z is hydrogen or $CH_3$, X is chlorine or bromine, A is chosen from the group of chloride, bromide, iodide, paratoluene sulfonate or any other physiologically acceptable anion, $n_1$, $n_2$ and $n_3$ are integers ranging from 1 to 10, and $m$ has the value of 1 or 2.

2. A bactericidal and fungicidal quaternary ammonium salt according to claim 1, wherein $R_1$ and $R_2$ are each methyl groups and $R_3$ is a dodecyl group.

3. A bactericidal and fungicidal quaternary ammonium salt according to claim 1, wherein $R_3$ represents a mixture of alkyls containing from $C_8$ to $C_{18}$ carbons.

4. A quaternary ammonium salt according to claim 1, where X is chlorine.

5. A bactericidal and fungicidal quaternary ammonium salt according to claim 1, wherein the sum of $n$, $n_2$ and $n_3$ ranges from 3 to 40.

6. A quaternary ammonium salt according to claim 1, wherein the anions are selected from the group consisting of chloride, bromide, or iodide.

* * * * *